US008843684B2

(12) United States Patent
Jones et al.

(10) Patent No.: US 8,843,684 B2
(45) Date of Patent: Sep. 23, 2014

(54) PERFORMING CALL STACK SAMPLING BY SETTING AFFINITY OF TARGET THREAD TO A CURRENT PROCESS TO PREVENT TARGET THREAD MIGRATION

(75) Inventors: Scott T. Jones, Austin, TX (US); Kean G. Kuiper, Round Rock, TX (US); Frank E. Levine, Austin, TX (US); Enio M. Pineda, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/813,706

(22) Filed: Jun. 11, 2010

(65) Prior Publication Data
US 2011/0307640 A1    Dec. 15, 2011

(51) Int. Cl.
*G06F 13/24*    (2006.01)
(52) U.S. Cl.
CPC ................................. *G06F 13/24* (2013.01)
USPC ........................ 710/267; 710/265; 710/260
(58) Field of Classification Search
USPC ................................................ 710/260–269
See application file for complete search history.

(56) References Cited

U.S. PATENT DOCUMENTS

| 5,305,454 | A | 4/1994 | Record et al. |
| 5,379,432 | A | 1/1995 | Orton et al. |
| 5,404,529 | A | 4/1995 | Chernikoff et al. |
| 5,465,328 | A | 11/1995 | Dievendorff et al. |
| 5,473,777 | A | 12/1995 | Moeller et al. |
| 5,475,845 | A | 12/1995 | Orton et al. |
| 5,544,318 | A | 8/1996 | Schmitz et al. |
| 5,625,359 | A | 4/1997 | Wilson et al. |
| 5,682,537 | A | 10/1997 | Davies et al. |
| 5,751,789 | A | 5/1998 | Farris et al. |
| 5,764,241 | A | 6/1998 | Elliott et al. |
| 5,768,500 | A | 6/1998 | Agrawal et al. |
| 5,913,213 | A | 6/1999 | Wikstrom et al. |
| 5,930,516 | A | 7/1999 | Watts et al. |
| 6,002,872 | A | 12/1999 | Alexander, III et al. |
| 6,012,094 | A | 1/2000 | Leymann et al. |

(Continued)

FOREIGN PATENT DOCUMENTS

| CN | 1614555 | 5/2005 |
| EP | 649084 A1 | 4/1995 |

(Continued)

OTHER PUBLICATIONS

International Search Report and Written Opinion for PCT/EP2011/057574 dated Aug. 2, 2011.

(Continued)

*Primary Examiner* — Raymond Phan
(74) *Attorney, Agent, or Firm* — Janaki K. Davda; Konrad, Raynes, Davda & Victor LLP (57) ABSTRACT

A sample is generated based on an event. Further, an interrupt handler captures information for an interrupted thread on a current processor. In addition, an affinity of the interrupted thread is set such that the interrupted thread runs only on the current processor without being able to migrate to a different processor. A sampler thread that runs on the current processor retrieves a call stack associated with the interrupted thread after the affinity of the interrupted thread has been set to the current processor. The affinity of the interrupted thread is restored after the call stack has been retrieved.

25 Claims, 6 Drawing Sheets

(56) References Cited

U.S. PATENT DOCUMENTS

| | | | |
|---|---|---|---|
| 6,055,492 A | 4/2000 | Alexander, III et al. | |
| 6,108,654 A | 8/2000 | Chan et al. | |
| 6,112,225 A | 8/2000 | Kraft et al. | |
| 6,125,363 A | 9/2000 | Buzzeo et al. | |
| 6,128,611 A | 10/2000 | Doan et al. | |
| 6,158,024 A | 12/2000 | Mandal | |
| 6,178,440 B1 | 1/2001 | Foster et al. | |
| 6,199,075 B1 | 3/2001 | Ungar et al. | |
| 6,233,585 B1 | 5/2001 | Gupta et al. | |
| 6,338,159 B1 | 1/2002 | Alexander, III et al. | |
| 6,438,512 B1 | 8/2002 | Miller | |
| 6,442,572 B2 | 8/2002 | Leymann et al. | |
| 6,449,614 B1 | 9/2002 | Marcotte | |
| 6,553,564 B1 | 4/2003 | Alexander, III et al. | |
| 6,601,233 B1 | 7/2003 | Underwood | |
| 6,625,602 B1 | 9/2003 | Meredith et al. | |
| 6,633,897 B1 | 10/2003 | Browning et al. | |
| 6,651,243 B1 | 11/2003 | Berry et al. | |
| 6,654,948 B1 | 11/2003 | Konuru et al. | |
| 6,658,652 B1 | 12/2003 | Alexander, III et al. | |
| 6,662,358 B1 | 12/2003 | Berry et al. | |
| 6,662,359 B1 | 12/2003 | Berry et al. | |
| 6,681,230 B1 | 1/2004 | Blott et al. | |
| 6,697,802 B2 | 2/2004 | Ma et al. | |
| 6,697,935 B1 | 2/2004 | Borkenhagen et al. | |
| 6,728,955 B1 | 4/2004 | Berry et al. | |
| 6,728,959 B1 | 4/2004 | Merkey | |
| 6,742,016 B1 | 5/2004 | Bhoj et al. | |
| 6,751,789 B1 | 6/2004 | Berry et al. | |
| 6,857,120 B1 | 2/2005 | Arnold et al. | |
| 6,874,074 B1 | 3/2005 | Burton et al. | |
| 6,880,086 B2 | 4/2005 | Kidder et al. | |
| 6,904,594 B1 | 6/2005 | Berry et al. | |
| 6,931,354 B2 | 8/2005 | Jones et al. | |
| 6,941,552 B1 | 9/2005 | Beadle et al. | |
| 6,954,922 B2 * | 10/2005 | Liang | 717/130 |
| 6,976,263 B2 | 12/2005 | Delaney | |
| 6,993,246 B1 | 1/2006 | Pan et al. | |
| 7,000,047 B2 | 2/2006 | Nguyen et al. | |
| 7,020,696 B1 | 3/2006 | Perry et al. | |
| 7,028,298 B1 | 4/2006 | Foote | |
| 7,047,258 B2 | 5/2006 | Balogh et al. | |
| 7,093,081 B2 | 8/2006 | DeWitt, Jr. et al. | |
| 7,114,036 B2 | 9/2006 | DeWitt, Jr. et al. | |
| 7,114,150 B2 | 9/2006 | Dimpsey et al. | |
| 7,162,666 B2 | 1/2007 | Bono | |
| 7,178,145 B2 | 2/2007 | Bono | |
| 7,206,848 B1 | 4/2007 | Zara et al. | |
| 7,222,119 B1 | 5/2007 | Ghemawat et al. | |
| 7,257,657 B2 * | 8/2007 | DeWitt et al. | 710/260 |
| 7,278,141 B2 | 10/2007 | Accapadi et al. | |
| 7,284,238 B2 | 10/2007 | Inagaki et al. | |
| 7,296,130 B2 | 11/2007 | Dimpsey et al. | |
| 7,321,965 B2 | 1/2008 | Kissell | |
| 7,325,108 B2 | 1/2008 | Tuel | |
| 7,398,518 B2 | 7/2008 | Dichter | |
| 7,426,730 B2 | 9/2008 | Mathews et al. | |
| 7,458,078 B2 | 11/2008 | DeWitt, Jr. et al. | |
| 7,474,991 B2 | 1/2009 | DeWitt et al. | |
| 7,496,918 B1 | 2/2009 | Dice et al. | |
| 7,526,757 B2 | 4/2009 | Levine et al. | |
| 7,529,914 B2 | 5/2009 | Saha et al. | |
| 7,574,587 B2 | 8/2009 | DeWitt, Jr. et al. | |
| 7,584,332 B2 | 9/2009 | Kogge et al. | |
| 7,587,364 B2 | 9/2009 | Crumbach et al. | |
| 7,610,585 B2 | 10/2009 | Shpeisman et al. | |
| 7,624,137 B2 | 11/2009 | Bacon et al. | |
| 7,653,895 B1 | 1/2010 | James-Roxby et al. | |
| 7,688,867 B1 | 3/2010 | Kizhepat | |
| 7,689,867 B2 | 3/2010 | Rosenbluth et al. | |
| 7,716,647 B2 | 5/2010 | Loh et al. | |
| 7,721,268 B2 * | 5/2010 | Loh et al. | 717/131 |
| 7,779,238 B2 | 8/2010 | Kosche et al. | |
| 7,788,664 B1 | 8/2010 | Janakiraman et al. | |
| 7,921,075 B2 | 4/2011 | Herness et al. | |
| 7,921,875 B2 | 4/2011 | Moriiki et al. | |
| 7,925,473 B2 | 4/2011 | DeWitt, Jr. et al. | |
| 7,962,913 B2 | 6/2011 | Accapadi et al. | |
| 7,962,924 B2 | 6/2011 | Kuiper et al. | |
| 7,996,593 B2 | 8/2011 | Blackmore et al. | |
| 7,996,629 B2 | 8/2011 | Wan et al. | |
| 8,018,845 B2 | 9/2011 | Ruello et al. | |
| 8,024,735 B2 | 9/2011 | Rudd et al. | |
| 8,117,599 B2 | 2/2012 | Edmark et al. | |
| 8,117,618 B2 | 2/2012 | Holloway et al. | |
| 8,132,170 B2 | 3/2012 | Kuiper et al. | |
| 8,136,124 B2 | 3/2012 | Kosche et al. | |
| 8,141,053 B2 | 3/2012 | Levine | |
| 8,156,495 B2 | 4/2012 | Chew et al. | |
| 8,191,049 B2 | 5/2012 | Levine et al. | |
| 8,286,134 B2 | 10/2012 | Jones et al. | |
| 8,381,215 B2 | 2/2013 | Johnson et al. | |
| 8,556,795 B2 | 10/2013 | Bolyard et al. | |
| 2002/0007363 A1 | 1/2002 | Vaitzblit | |
| 2002/0016729 A1 | 2/2002 | Breitenbach et al. | |
| 2002/0038332 A1 | 3/2002 | Alverson et al. | |
| 2002/0073103 A1 | 6/2002 | Bottomley et al. | |
| 2003/0004970 A1 | 1/2003 | Watts | |
| 2003/0023655 A1 | 1/2003 | Sokolov et al. | |
| 2003/0061256 A1 | 3/2003 | Mathews et al. | |
| 2003/0083912 A1 | 5/2003 | Covington, III et al. | |
| 2003/0233394 A1 | 12/2003 | Rudd et al. | |
| 2004/0068501 A1 | 4/2004 | McGoveran | |
| 2004/0093510 A1 | 5/2004 | Nurmela | |
| 2004/0142679 A1 | 7/2004 | Kearns et al. | |
| 2004/0148594 A1 | 7/2004 | Williams | |
| 2004/0162741 A1 | 8/2004 | Flaxer et al. | |
| 2004/0163077 A1 | 8/2004 | Dimpsey et al. | |
| 2004/0178454 A1 | 9/2004 | Kuroda et al. | |
| 2004/0193510 A1 | 9/2004 | Catahan, Jr. et al. | |
| 2004/0215614 A1 | 10/2004 | Doyle et al. | |
| 2004/0215768 A1 | 10/2004 | Oulu et al. | |
| 2004/0216112 A1 | 10/2004 | Accapadi et al. | |
| 2004/0220931 A1 | 11/2004 | Guthridge et al. | |
| 2004/0220932 A1 | 11/2004 | Seeger et al. | |
| 2004/0220933 A1 | 11/2004 | Walker | |
| 2004/0268316 A1 | 12/2004 | Fisher et al. | |
| 2005/0021354 A1 | 1/2005 | Brendle et al. | |
| 2005/0080806 A1 | 4/2005 | Doganata et al. | |
| 2005/0086455 A1 | 4/2005 | DeWitt, Jr. et al. | |
| 2005/0091663 A1 | 4/2005 | Bagsby | |
| 2005/0102493 A1 | 5/2005 | DeWitt, Jr. et al. | |
| 2005/0102673 A1 | 5/2005 | DeWitt, Jr. et al. | |
| 2005/0138443 A1 | 6/2005 | Cooper | |
| 2005/0149585 A1 | 7/2005 | Bacon et al. | |
| 2005/0155018 A1 | 7/2005 | DeWitt, Jr. et al. | |
| 2005/0155019 A1 | 7/2005 | Levine et al. | |
| 2005/0166187 A1 | 7/2005 | Das et al. | |
| 2005/0204349 A1 | 9/2005 | Lewis et al. | |
| 2005/0256961 A1 | 11/2005 | Alon et al. | |
| 2005/0262130 A1 | 11/2005 | Mohan | |
| 2005/0273757 A1 | 12/2005 | Anderson | |
| 2005/0273782 A1 | 12/2005 | Shpeisman et al. | |
| 2006/0004757 A1 | 1/2006 | Watts | |
| 2006/0023642 A1 | 2/2006 | Roskowski et al. | |
| 2006/0031837 A1 | 2/2006 | Theurer | |
| 2006/0059486 A1 * | 3/2006 | Loh et al. | 718/100 |
| 2006/0072563 A1 | 4/2006 | Regnier et al. | |
| 2006/0080486 A1 | 4/2006 | Yan | |
| 2006/0095571 A1 | 5/2006 | Gilgen et al. | |
| 2006/0130001 A1 | 6/2006 | Beuch et al. | |
| 2006/0136914 A1 | 6/2006 | Marascio et al. | |
| 2006/0149877 A1 | 7/2006 | Pearson | |
| 2006/0167955 A1 | 7/2006 | Vertes | |
| 2006/0184769 A1 | 8/2006 | Floyd et al. | |
| 2006/0212657 A1 | 9/2006 | Tuel | |
| 2006/0218290 A1 | 9/2006 | Lin et al. | |
| 2006/0259911 A1 | 11/2006 | Weinrich et al. | |
| 2006/0282400 A1 | 12/2006 | Kalavacharla et al. | |
| 2006/0282707 A1 | 12/2006 | Rosenbluth et al. | |
| 2007/0006168 A1 | 1/2007 | Dimpsey et al. | |
| 2007/0033589 A1 | 2/2007 | Nicholas et al. | |
| 2007/0150904 A1 | 6/2007 | Kim et al. | |
| 2007/0169003 A1 | 7/2007 | Branda et al. | |

(56) References Cited

U.S. PATENT DOCUMENTS

| | | | |
|---|---|---|---|
| 2007/0171824 | A1 | 7/2007 | Ruello et al. |
| 2007/0220495 | A1 | 9/2007 | Chen et al. |
| 2007/0220515 | A1 | 9/2007 | Dewitt, Jr. et al. |
| 2007/0226139 | A1 | 9/2007 | Crumbach et al. |
| 2008/0082761 | A1 | 4/2008 | Herness et al. |
| 2008/0082796 | A1 | 4/2008 | Merten et al. |
| 2008/0091679 | A1 | 4/2008 | Herness et al. |
| 2008/0091712 | A1 | 4/2008 | Daherkar et al. |
| 2008/0148240 | A1 | 6/2008 | Jones et al. |
| 2008/0148241 | A1 | 6/2008 | Jones et al. |
| 2008/0148299 | A1 | 6/2008 | Daherkar et al. |
| 2008/0177756 | A1 | 7/2008 | Kosche et al. |
| 2008/0189687 | A1 | 8/2008 | Levine et al. |
| 2008/0196030 | A1 | 8/2008 | Buros et al. |
| 2008/0263325 | A1 | 10/2008 | Kudva et al. |
| 2008/0307441 | A1 | 12/2008 | Kuiper et al. |
| 2009/0007075 | A1 | 1/2009 | Edmark et al. |
| 2009/0044198 | A1 | 2/2009 | Kuiper et al. |
| 2009/0083002 | A1 | 3/2009 | DeWitt et al. |
| 2009/0100432 | A1 | 4/2009 | Holloway et al. |
| 2009/0106762 | A1 | 4/2009 | Accapadi et al. |
| 2009/0178036 | A1 | 7/2009 | Levine |
| 2009/0187909 | A1 | 7/2009 | Russell et al. |
| 2009/0187915 | A1 | 7/2009 | Chew et al. |
| 2009/0204978 | A1* | 8/2009 | Lee et al. ............... 719/321 |
| 2009/0210649 | A1 | 8/2009 | Wan et al. |
| 2009/0235247 | A1 | 9/2009 | Cho et al. |
| 2009/0235262 | A1 | 9/2009 | Ceze et al. |
| 2009/0241095 | A1 | 9/2009 | Jones et al. |
| 2009/0271549 | A1 | 10/2009 | Blackmore et al. |
| 2009/0292846 | A1 | 11/2009 | Park et al. |
| 2009/0300224 | A1 | 12/2009 | Duffy et al. |
| 2010/0017447 | A1 | 1/2010 | Jones et al. |
| 2010/0017581 | A1 | 1/2010 | Clift et al. |
| 2010/0017583 | A1 | 1/2010 | Kuiper et al. |
| 2010/0017584 | A1 | 1/2010 | Jones et al. |
| 2010/0017789 | A1 | 1/2010 | Dewitt, Jr. et al. |
| 2010/0017804 | A1 | 1/2010 | Gupta et al. |
| 2010/0036981 | A1 | 2/2010 | Ganesh et al. |
| 2010/0333071 | A1 | 12/2010 | Kuiper et al. |
| 2011/0289361 | A1* | 11/2011 | Kuiper et al. ............... 714/45 |
| 2011/0320173 | A1 | 12/2011 | Levine |
| 2012/0191893 | A1 | 7/2012 | Kuiper et al. |

FOREIGN PATENT DOCUMENTS

| | | | |
|---|---|---|---|
| EP | 000689141 | A2 | 12/1995 |
| EP | 1603307 | A2 | 12/2005 |
| JP | 11-327951 | | 11/1999 |
| JP | 2002-055848 | | 2/2002 |
| JP | 2004-199330 | | 7/2004 |
| JP | 2005-141392 | | 6/2005 |
| JP | 2008-257287 | | 10/2008 |
| KR | 2009098500 | A | 9/2009 |
| WO | WO2009014868 | | 1/2009 |

OTHER PUBLICATIONS

IBM, "Pacing support for Time Based Context Sampling," ip.com, Jan. 22, 2009.
Harkema, et al. Performance Monitoring of Java Applications, Jul. 2002.
Alexander, et al. A unifying approach to performance analysis in the Java enviroment, IBM Systems Journal, vol. 39, No. 1, 2000.
IBM, "Process and Thread Sampling—Target Selection in Interrupt Mode," ip.com, Jul. 16, 2008.
Cao, Zhongbo, et al., "A Study of Java Virtual Machine Scalability Issues on SMP Systems," IEEE, Proceedings of the 2005 IEEE International Symposium on Workload Characterization, Oct. 6-8, 2005, pp. 119-128.
Chen, Liang, et al., "Resource Allocation in a Middleware for Streaming Data," Middleware 2004 Companion, 2nd Workshop on Middleware for Grid Computing, ACM 2004, pp. 5-10.
Korochkin, Dmitry, et al., "Experimental Performance Analysis of the Ada95 and Java Parallel Program on SMP Systems." SIGAda'02, Dec. 8-12, 2002, ACM, pp. 53-56.
Tam, David, et al., "Thread Clustering: Sharing-Aware Scheduling on SMP-CMP-SMT Multiprocessors," EuroSys'07, Mar. 21-23, 2007, pp. 47-58.
International Search Report and Written Opinion dated Sep. 3, 2010 for International Application No. PCT/EP2010/058486, 8 pages.
U.S. Appl. No. 11/834,779.
Whaley, John, "A Portable Sampling-Based Profiler for Java Virtual Machines," Proceedings of the ACM 2000 Java Grande Conference, Jun. 3, 2000, pp. 78-87.
Asokan-et al.; "Providing Time-and Space-Efficient Procedure Calls for Asynchronous Software Thread Integration"; pp. 167-187; Sep. 2004.
Mohanty-et al.; "A Hierarchical Approach for Energy Efficient Application Design Using Heterogeneous Embedded Systems"; pp. 243-255; Oct.-Nov. 2003.
Von Behren-et al.; "Capriccio: Scalable Threads for Internet Services"; ACM Digital Library; pp. 268-280; Oct. 2003.
Foong-et al.; "Architectural Characterization of Processor Affinity in Network Processing"; IEEE; 2005.
Milton, Scott; "Thread Migration in Distributed Memory Multicomputers", The Australian National University, Joint Computer Science Technical Report Series, Feb. 1998.
Abdel-Shafi, et al.; "Efficient User-Level Thread Migration and Checkpointing on Windows NT Clusters", Proceedings of The 3rd USENIX Windows NT Symposium, Jul. 12-13, 1999.
Tullsen, et al. "Handling Long-latency Loads in a Simultaneous Multithreading Processor," IEEE, 2001, pp. 318-327.
Purser, et al. "A Study of Slipstream Processors," IEEE, 2000, pp. 269-280.
Choi, et al. "Deterministic Replay of Java Mulithreaded Applications," ACM SIGMETRICS Symposium on Parallel and Distributed Tools (SPDT), Aug. 1998, pp. 48-59.
Alkalaj, et al. "Performance of Multi-Threaded Execution in a Shared-Memory Multiprocessor," IEEE, 1991, p. 330-333.
Arpaci-Dusseau, Andrea Carol, "Implicit Coscheduling: Coordinated Scheduling with Implicit Information in Distributed Systems", ACM Transactions on Computer Systems, vol. 19, No. 3, Aug., 2011, pp. 283-331 [Also Total 49 pp.]
Barcia, R. and J. Brent, "IBM WebSphere Developer Technical Journal: Building SOA Solutions with the Service Component Architecture—Part 1", 26 Oct. 2005, Total.
Cerami, Ethan, "Web Services Essentials", Feb. 2002, O'Reilly, First Edition, Total 286 pp.
Amendment 1, Oct. 24, 2010, for U.S. Appl. No. 11/549,609, filed Oct. 13, 2006 by A.R. Daherkar et al., Total 16 pp.
Amendment 2, Apr. 14, 2011, for U.S. Appl. No. 11/549,609, filed Oct. 13, 2006 by A.R. Daherkar et al., Total 12 pp.
Amendment 3, Sep. 8, 2011, for U.S. Appl. No. 11/549,609, filed Oct. 13, 2006 by A.R. Daherkar et al., Total 16 pp.
Appeal Brief. Mar. 26, 2012, for U.S. Appl. No. 11/549,609, filed Oct. 13, 2006 by A.R. Daherkar et al., Total 22 pp.
Examiner's Answer, Apr. 26, 2012, for U.S. Appl. No. 11/549,609, filed Oct. 13, 2006 by A.R. Daherkar et al., Total 15 pp.
Final Office Action 1, Jan. 19, 2011, for U.S. Appl. No. 11/549,609, filed Oct. 13, 2006 by A.R. Daherkar et al., Total 25 pp.
Final Office Action 2, Oct. 24, 2011, for U.S. Appl. No. 11/549,609, filed Oct. 13, 2006 by A.R. Daherkar et al., Total 23 pp.
Notice of Appeal, Jan. 24, 2012, for U.S. Appl. No. 11/549,609, filed Oct. 13, 2006 by A.R. Daherkar et al., Total 2 pp.
Office Action 1, Jul. 27, 2010, for U.S. Appl. No. 11/549,609, filed Oct. 13, 2006 by A.R. Daherkar et al., Total 22 pp.
Office Action 3, Jun. 8, 2011, for U.S. Appl. No. 11/549,609, filed Oct. 13, 2006 by A.R. Daherkar et al., Total 39 pp.
Amendment 1, Dec. 16, 2008, for U.S. Appl. No. 11/549,613, filed Oct. 13, 2006 by A.R. Daherkar et al., Total 16 pp.
Amendment 2, Jun. 16, 2009, for U.S. Appl. No. 11/549,613, filed Oct. 13, 2006 by A.R. Daherkar et al., Total 13 pp.
Amendment 3, Nov. 15, 2009, for U.S. Appl. No. 11/549,613, filed Oct. 13, 2006 by A.R. Daherkar et al., Total 12 pp.

(56) References Cited

OTHER PUBLICATIONS

Appeal Brief, Aug. 3, 2010, for U.S. Appl. No. 11/549,613, filed Oct. 13, 2006 by A.R. Daherkar et al., Total 26 pp.
Final Office Action 1, Mar. 16, 2009, for U.S. Appl. No. 11/549,613, filed Oct. 13, 2006 by A.R. Daherkar et al., Total 34 pp.
Final Office Action 2, Mar. 3, 2010, for U.S. Appl. No. 11/549,613, filed Oct. 13, 2006 by A.R. Daherkar et al., Total 42 pp.
Notice of Appeal, Jun. 3, 2010, for U.S. Appl. No. 11/549,613, filed Oct. 13, 2006 by A.R. Daherkar et al., Total 2 pp.
Office Action 1, Sep. 16, 2008, for U.S. Appl. No. 11/549,613, filed Oct. 13, 2006 by A.R. Daherkar et al., Total 44 pp.
Office Action 3, Aug. 17, 2009, for U.S. Appl. No. 11/549,613, filed Oct. 13, 2006 by A.R. Daherkar et al., Total 34 pp.
Reply Brief, Dec. 27, 2010, for U.S. Appl. No. 11/549,613, filed Oct. 13, 2006 by A.R. Daherkar et al., Total 11 pp.
Amendment 1, Nov. 13, 2008, for U.S. Appl. No. 11/536,962, filed Sep. 29, 2006 by E.N. Herness et al., Total 8 pp.
Amendment 2, Jan. 8, 2009, for U.S. Appl. No. 11/536,962, filed Sep. 29, 2006 by E.N. Herness et al., Total 18 pp.
Amendment 3, Aug. 11, 2009, for U.S. Appl. No. 11/536,962, filed Sep. 29, 2006 by E.N. Herness et al., Total 24 pp.
Amendment 4, Mar. 1, 2010, for U.S. Appl. No. 11/536,962, filed Sep. 29, 2006 by E.N. Herness et al., Total 22 pp.
Amendment 5, Aug. 19, 2010, for U.S. Appl. No. 11/536,962, filed Sep. 29, 2006 by E.N. Herness et al., Total 11 pp.
Final Office Action 1, May 14, 2009, for U.S. Appl. No. 11/536,962, filed Sep. 29, 2006 by E.N. Herness et al., Total 42 pp.
Final Office Action 2, May 28, 2010, for U.S. Appl. No. 11/536,962, filed Sep. 29, 2006 by E.N. Herness et al., Total 49 pp.
Notice of Allowance 1, Sep. 7, 2010, for U.S. Appl. No. 11/536/962, filed Sep. 29, 2006 by E.N. Herness et al., Total 24 pp.
Notice of Allowance 2, Nov. 23, 2010, for U.S. Appl. No. 11/536,962, filed Sep. 29, 2006 by E.N. Herness et al., Total 27 pp.
Office Action 1, Oct. 27, 2008, for U.S. Appl. No. 11/536,962, filed Sep. 29, 2006 by E.N. Herness et al., Total 11 pp.
Office Action 2, Dec. 24, 2008, for U.S. Appl. No. 11/536,962, filed Sep. 29, 2006 by E.N. Herness et al., Total 8 pp.
Office Action 3, Dec. 1, 2009, for U.S. Appl. No. 11/536,962, filed Sep. 29, 2006 by E.N. Herness et al., Total 39 pp.
Amendment 1, Dec. 8, 2008, for U.S. Appl. No. 11/536,941, filed Sep. 29, 2006 by E.N. Herness et al., Total 7 pp.
Amendment 2, Apr. 13, 2009, for U.S. Appl. No. 11/536,941, filed Sep. 29, 2006 by E.N. Herness et al., Total 9 pp.
Notice of Allowance 1, Jan. 14, 2009, for U.S. Appl. No. 11/536,941, filed Sep. 29, 2006 by E.N. Herness et al., Total 9 pp.
Notice of Allowance 2, May 15, 2009, for U.S. Appl. No. 11/536,941, filed Sep. 29, 2006 by E.N. Herness et al., Total 11 pp.
Notice of Allowance 3, Jun. 22, 2009, for U.S. Appl. No. 11/536,941, filed Sep. 29, 2006 by E.N. Herness et al., Total 10 pp.
Office Action 1, Nov. 14, 2008, for U.S. Appl. No. 11/536,941, filed Sep. 29, 2006 by E.N. Herness et al., Total 18 pp.
Office Action 1, Feb. 17, 2011, for U.S. Appl. No. 11/834,779, filed Aug. 7, 2007 by K.G. Kuiper et al., Total 38 pp.
Final Office Action 1, Jul. 15, 2011, for U.S. Appl. No. 11/834,779, filed Aug. 7, 2007 by K.G. Kuiper et al., Total 17 pp.
Notice of Allowance 1, Oct. 25, 2011, for U.S. Appl. No. 11/834,779, filed Aug. 7, 2007 by K.G. Kuiper et al., Total 51 pp.
Response to Office Action 1, May 17, 2011, for U.S. Appl. No. 11/834,779, filed Aug. 7, 2007 by K.G. Kuiper et al., Total 13 pp.
Response to Final Office Action 1, Oct. 17, 2011, for U.S. Appl. No. 11/834,779, filed Aug. 7, 2007 by K. G. Kuiper et al., Total 8 pp.
Office Action 1, Nov. 21, 2011, for U.S. Appl. No. 12/173,047, filed Jul. 15, 2008 by K.G. Kuiper et al., Total 19 pp.
Response to Office Action 1, Feb. 20, 2012, for U.S. Appl. No. 12/173,047, filed Jul. 15, 2008 by K.G. Kuiper et al., Total 17 pp.
U.S. Patent Application with U.S. Appl. No. 13/011,621, filed Jan. 21, 2011, entitled "Scalable System Call Stack Sampling" invented by Kuiper, K.G. and F.E. Levine, Total 34 pp.
Office Action 1, Jun. 27, 2012, for U.S. Appl. No. 12/494,469, filed Jun. 30, 2009 by K.G. Kuiper et al., Total 21 pp.
U.S. Appl. No. 11/549,609, filed Oct. 13, 2006 by A.R. Daherkar et al., Total 3 pp.
Aug. 9, 2012, for U.S. Appl. No. 12/824,217, filed Jun. 27, 2010 by F.E. Levine, Total 2 pp.
Aug. 9, 2012, for U.S. Appl. No. 11/549,613, filed Oct. 13, 2006 by a.R. Daherkar et al., Total 3 pp.
Aug. 9, 2012, for U.S. Appl. No. 12/786,381, filed May 24, 2010 by K.G. Kuiper et al., Total 2 pp.
Aug. 9, 2012, for U.S. Appl. No. 13/011,621, filed Jan. 21, 2011 by K.G. Kuiper et al., Total 2 pp.
Aug. 9, 2012, for U.S. Appl. No. 12/173,047, filed Jul. 15, 2008 by K.G. Kuiper et al., Total 2 pp.
Aug. 9, 2012, for U.S. Appl. No. 12/494,469, filed Jun. 30, 2009 by K.G. Kuiper et al., Total 4 pp.
Aug. 9, 2012, for U.S. Appl. No. 11/536,962, filed Sep. 29, 2006 by E.N. Herness et al., Total 1 p.
Aug. 9, 2012, for U.S. Appl. No. 11/536,941, filed Sep. 29, 2006 by E.N. Herness et al., Total 2 pp.
Mansouri-Samani, M. and M. Sloman, "A Configurable Even Service for Distributed Systems", © 1996 IEEE, Total 8 pp.
Meyer, K., B. Gas, and J. Doughty, "The Devolution of Functional Analysis", Oct. 26, 1982, Total 26 pp.
Rinard, M.C. And P.C. Diniz, "Eliminating Synchronization Bottlenecks Using Adaptive Replication", © 2003 ACM, ACM Transactions on Programming Languages and Sysems, vol. 25, Nol. 3, May 2003, pp. 316-359. [Also, Total 44 pp.].
Tidwell, D., J. Snell, and P. Kulchenko, "Programming Web Services with SOAP", O'Reilly, First Edition Dec. 2001, ISBN: 0-596-00095-2, 216 pages, Total 225 pp.
Websphere 6.0.2, "Processing Events in a Sequence", IBM, [online], [Retrieved on May 12, 2011]. Retrieved from the Internet at <URL: http://publib.boulder.ibm.com/infocenter/dmndhelp/v6rxmx/topic/com.ibm.wbit.help.wirin . . .>, Oct. 7, 2005, Total 9 pp.
Office Action 1, Sep. 19, 2012, for U.S. Appl. No. 12/786,381, filed May 24, 2010 by K.G. Kuiper et al., Total 28 pp.
Amendment 1, Sep. 25, 2012, for U.S. Appl. No. 12/494,469, filed Jun. 30, 2009 by K.G. Kuiper et al., Total 15 pp.
Office Action 1, Oct. 9, 2012, for U.S. Appl. No. 13/011,621, filed Jan. 21, 2011 by K.G. Kuiper et al., Total 25 pp.
Reply Brief, Jun. 25, 2012, for U.S. Appl. No. US11/549,609, filed Oct. 13, 2006 by A.R. Daherkar et al., Total 12 pp.
Examiner's Answer, Oct. 27, 2010, for U.S. Appl. No. 11/549,613, filed Oct. 13, 2006 by A.R. Daherkar et al., Total 37 pp.
Examiner's Answer, Apr. 26, 2012, for U.S. Appl. No. 11/549,609, filed Oct. 13, 2006 by A.R. Daherkar et al., Total 12 pp.
Office Action 1, Oct. 18, 2012, for U.S. Appl. No. 12/824,217, filed Jun. 27, 2010 by F.E. Levine, Total 23 pp.
Final Office Action 1, Jun. 14, 2012, for U.S. Appl. No. 12/173,047, filed Jul. 15, 2008 by K.G. Kuiper et al., Total 22 pp.
Response to Final Office Action 1, Sep. 14, 2012, for U.S. Appl. No. 12/173,047, filed Jul. 15, 2008 by K. G. Kuiper et al., Total 19 pp.
Final Office Action 1, Mar. 18, 2013, for U.S. Appl. No. 13/011,621, filed Jan. 21, 2011 by K.G. Kuiper et al., Total 30 pp.
U.S. Appl. No. 12/173,047, filed Jul. 15, 2008 by K.G. Kuiper et al., Total 2 pp.
U.S. Appl. No. 11/834,779, filed Aug. 7, 2007 by K. G. Kuiper et al., Total 2 pp.
U.S. Appl. No. 12/786,381, filed May 24, 2010 by K.G. Kuiper et al., Total 4 pp.
U.S. Appl. No. 12/824,217, filed Sep. 29, 2006 by E.N. Herness et al., Total 3 pp.
U.S. Appl. No. 13/011,621, filed Jan. 21, 2011 by K.G. Kuiper et al., Total 3 pp.
Amendment 1, Jan. 18, 2013, for U.S. Appl. No. 12/824,217, filed Jun. 27, 2010 by F.E. Levine, Total 11 pp.
Notice of Allowance 1, Jan. 17, 2013, for U.S. Appl. No. 12/494,469, filed Jun. 30, 2009 by K.G. Kuiper et al., Total 7 pp.
Amendment 1, Feb. 5, 2013, for U.S. Appl. No. 13/011,621, filed Jan. 21, 2011 by K.G. Kuiper et al., Total 11 pp.
Amendment 1, Dec. 27, 2012, for U.S. Appl. No. 12/786,381, filed May 24, 2010 by K.G. Kuiper et al., Total 11 pp.
Amendment 2, Jan. 3, 2013, for U.S. Appl. No. 12/494,469, filed on Jun. 30, 2009 by K.G. Kuiper et al., Total 12 pp.

(56) References Cited

OTHER PUBLICATIONS

Final Office Action 1, Nov. 6, 2012, for U.S. Appl. No. 12/494,469, filed Jun. 30, 2009 by K.G. Kuiper et al., Total 10 pp.
Amendment 2, Jun. 19, 2013, for U.S. Appl. No. 12/824,217, filed Jun. 27, 2010 by F.E. Levine, Total 12 pp.
Amendment 2, Jun. 13, 2013, for U.S. Appl. No. 13/011,621, filed Jan. 21, 2011 by Kuiper et al., Total 7 pp.
Amendment 2, Jul. 3, 2013, for U.S. Appl. No. US12/786,381, filed May 24, 2010 by K.G. Kuiper et al., Total 9 pp.
Final Office Action 1, Apr. 3, 2013, for Application No. US12/786,381, filed May 24, 2010 by K.G. Kuiper et al., Total 55 pp.
Final Office Action 1, Mar. 20, 2013, for U.S. Appl. No. 12/824,217, filed Jun. 27, 2010 by F.E. Levine, Total 35 pp.
Notice of Allowance 1, Jul. 9, 2013, for U.S. Appl. No. 13/011,621, filed Jan. 21, 2011 by Kuiper et al., Total 11 pp.
Office Action, Apr. 25, 2013, for U.S. Appl. No. 12/173,047, filed Jul. 15, 2008 by K.G. Kuiper et al., Total 45 pp.
Response to Office Action, Jul. 22, 2013, for U.S. Appl. No. 12/173,047, filed Jul. 15, 2008 by K.G. Kuiper et al., Total 12 pp.
Notice of Allowance 1, Aug. 28, 2013, for U.S. Appl. No. 12/786,381, filed May 24, 2010 by K.G. Kuiper et al., Total 17 pp.
AIX Versions 3.2 and 4 Performance Tuning Guide, Performance Overview of the Virtual Memory Manager (VMM), Apr. 1997 http://nfosolutions.com/doc_link/C/a_doc_libiaixbman/prftungd/vm-mov.htm, 8 pp.
Binder, "Portable and Accurate Sampling Profiling for Java", Software—Practice and Experience, vol. 36, Issue 6, May 2006, pp. 615-650.
Chanda et al., "Whodunit: Transactional Profiling for Multi-Tier Applications", ACM, EuroSys'07, Mar. 2007 Lisboa, Portugal, pp. 17-30.
Dunlavey, "Performance Tuning with Instruction-Level Cost Derived from Call-Stack Sampling", ACM SIGPLAN Notices, vol. 42(8), Aug. 2007, pp. 4-8.
Froyd et al., "Low-Overhead Call Path Profiling of Unmodified, Optimized Code", ACM, ICS'05 Cambridge, Massachusetts, pp. 81-90.
Graham et al., "gprof: a Call Graph Execution Profiler," Proceedings of the 1982 SIGPLAN Symposium on Compiler Construction, Jun. 1982m pp. 120-126.
Sun Java Real-Time System 2.0_01, Garbage Collection Guide, Nov. 21, 2007 http://download.oracle.com/javase/realtime/doc_2.0_u1/release/JavaRTSGarbageCollection.html, 12 pp.
Office Action 1, dated Dec. 19, 2011, for U.S. Appl. No. 12/173,053, 15 pp.
Response to Office Action 1, dated Mar. 19, 2012, for U.S. Appl. No. 12/173,053, 17 pp.
Final Office Action 1, dated May 2, 2012, for U.S. Appl. No. 12/173,053, 16 pp.
Appeal Brief, dated Jul. 23, 2012, for U.S. Appl. No. 12/173,053, 23 pp.
Notice of Allowance, dated Jun. 13, 2013, for U.S. Appl. No. 12/173,053, 13 pp.
Office Action 1, dated Jan. 5, 2012, for U.S. Appl. No. 12/173,107, 21 pp.
Response to Office Action 1, dated Mar. 30, 2012, for U.S. Appl. No. 12/173,107, 15 pp.
Notice of Allowance, dated Jun. 6, 2012, for U.S. Appl. No. 12/173,107, 10 pp.
Office Action 1, dated Feb. 2, 2011, for U.S. Appl. No. 12/235,302, 16 pp.
Response to Office Action 1, dated Apr. 20, 2011, for U.S. Appl. No. 12/235,302, 24 pp.
Final Office Action 1, dated Jul. 20, 2011, for U.S. Appl. No. 12/235,302, 17 pp.
Appeal Brief, dated Dec. 13, 2011, for U.S. Appl. No. 12/235,302, 35 pp.
Examiner's Answer, dated Feb. 27, 2012, for U.S. Appl. No. 12/235,302, 20 pp.
Reply Brief, dated Apr. 27, 2012, for U.S. Appl. No. 12/235,302, 5 pp.
Supplemental Notice of Allowance 1, dated Nov. 19, 2013, for U.S. Appl. No. 12/824,217, 6 pp.
Notice of Allowance 2, dated Dec. 9, 2013, for U.S. Appl. No. 13/011,621, 11 pp.
Office Action 1 for CN Application No. 201080010002.9, dated Sep. 4, 2013, 9 pp.
Notice of Allowance, dated Nov. 12, 2013, for U.S. Appl. No. 12/494,469, filed Jun. 30, 2009, 14 pp.
US Patent No. 7,458,078, dated Nov. 25, 2008, is an English language equivalent of CN1614555, dated May 11, 2005.
US Publication No. 2005/0102673, dated May 12, 2005, is an English language equivalent of CN1614555, dated May 11, 2005.
Response to Examination Report for GB Application No. 1212738.7, dated Dec. 11, 2013, 7 pp.
Notice of Allowance 2, dated Dec. 19, 2013, for U.S. Appl. No. 12/786,381, 10 pp.
Notice of Allowance 1 for U.S. Appl. No. 12/173,047, dated Sep. 11, 2013, 22 pp.
Notice of Allowance 1 for U.S. Appl. No. 12/824,217, dated Sep. 27, 2013, 20 pp.
Office Action 3, Apr. 14, 2014, for U.S. Appl. No. 12/786,381, filed May 24, 2010 by K.G. Kuiper et al., Total 16 pp.
Corrected Notice of Allowability, Apr. 7, 2014, for U.S. Appl. No. 12/824,217, filed Jun. 27, 2010 by F.E. Levine, Total 9 pp.
Notice of Allowance 2, Feb. 14, 2014, for U.S. Appl. No. 12/824,217, filed Jun. 27, 2010 by F.E. Levine, Total 21 pp.
Notice of Allowance 3, Mar. 20, 2014, for U.S. Appl. No. 13/011,621, filed Jan. 21, 2011 by K.G. Kuiper et al., Total 20 pp.
Notice of Allowance 2, Nov. 20, 2013, for U.S. Appl. No. 12/173,047, filed Jul. 15, 2008 by K.G. Kuiper et al., Total 35 pp.
Amendment 3, Mar. 18, 2014, for U.S. Appl. No. 12/786,381, filed May 24, 2010 by K.G. Kuiper et al., Total 9 pp.
US Patent No. 6,002,872, dated Dec. 14, 1999, is an English language equivalent of JP11-327951, dated Nov. 30, 1999.
US Patent No. 7,284,238, dated Oct. 16, 2007, is an English language equivalent of JP2004-199330, dated Jul. 15, 2004.
Machine Translation of JP Publication No. 2002-055848, dated Feb. 20, 2002, 23 pp.
Machine Translation of JP Publication No. 2005-141392, dated Jun. 2, 2005, 18 pp.
Machine Translation of JP Publication No. 2008-257287, dated Oct. 23, 2008, 32 pp.
Corrected Notice of Allowability, Apr. 25, 2014, for U.S. Appl. No. 12/824,217, filed Jun. 27, 2010 by F.E. Levine, Total 7 pp.
US 8,589,928, 11/2013, Kuiper et al. (withdrawn)

* cited by examiner

PERFORMING CALL STACK SAMPLING BY SETTING AFFINITY OF TARGET THREAD TO A CURRENT PROCESS TO PREVENT TARGET THREAD MIGRATION

BACKGROUND

1. Field

This disclosure generally relates to a computing environment. More particularly, the disclosure relates to sampling technology.

2. General Background

Either time-based or hardware event-based sampling technology is typically utilized in application profiling tools to determine the specific usage of resources. A current approach is to sample by periodically generating interrupts. At each interrupt the current process/thread, the instruction being executed and, optionally, the data address being accessed, may be identified and recorded. At a later time the collected data is aggregated, and reports are generated showing sample distribution by address, symbol, process, etc. A variety of tools are based on this technology. The full execution context of the sample is not typically recorded and not available in reports.

Attempts have been made to improve this technology by getting call stacks at the time of the sample. The existing set of tools may either attempt to walk the call stack directly or invoke functions on a separate (sampler) thread to obtain the interrupted thread's call stack.

SUMMARY

In one aspect of the disclosure, a computer program product is provided. The computer program product includes a computer useable medium having a computer readable program. The computer readable program when executed on a computer causes the computer to generate an interrupt based on an event. Further, the computer readable program when executed on the computer causes the computer to capture information, with an interrupt handler, for an interrupted thread on a current processor. In addition, the computer readable program when executed on the computer causes the computer to set an affinity of the interrupted thread such that the interrupted thread runs only on the current processor without being able to migrate to a different processor. The computer readable program when executed on the computer causes the computer to retrieve, with a sampler thread that runs on the current processor, a call stack associated with the interrupted thread after the processor affinity of the interrupted thread has been set to the current processor. Further, the computer readable program when executed on the computer causes the computer to restore the affinity of the interrupted thread after the call stack has been retrieved.

In another aspect of the disclosure, a process is provided. The process generates an interrupt based on an event. Further, the process captures information, with an interrupt handler, for an interrupted thread on a current processor. In addition, the process sets an affinity of the interrupted thread such that the interrupted thread runs only on the current processor without being able to migrate to a different processor. The process also retrieves, with a sampler thread that runs on the current processor, a call stack associated with the interrupted thread after the affinity of the interrupted thread has been set to the current processor. Further, the process restores the affinity of the interrupted thread after the call stack has been retrieved.

In yet another aspect of the disclosure, a system is provided. The system includes a current processor that generates an interrupt based on an event. Further, the system includes an operating system that (i) captures information, with an interrupt handler, for an interrupted thread on a current processor and (ii) sets an affinity of the interrupted thread such that the interrupted thread runs only on the current processor without being able to migrate to a different processor. In addition, the system includes a profiler that retrieves, with a sampler thread that runs on the current processor, a call stack associated with the interrupted thread after the affinity of the interrupted thread has been set to the current processor.

In another aspect of the disclosure, a computer program product is provided. The computer program product includes a computer useable medium having a computer readable program. The computer readable program when executed on a computer causes the computer to generate, with a current processor, an interrupt based on an event. Further, the computer readable program when executed on the computer causes the computer to capture information, with an interrupt handler, for an interrupted thread on a current processor. In addition, the computer readable program when executed on the computer causes the computer to set an affinity of the interrupted thread such that the interrupted thread runs only on the current processor without being able to migrate to a different processor. The computer readable program when executed on the computer causes the computer to retrieve, with a sampler thread that runs on the current processor, a call stack associated with the interrupted thread after the affinity of the interrupted thread has been set to the current processor. Further, the computer readable program when executed on the computer causes the computer to restore the affinity of the interrupted thread after the call stack has been retrieved.

DRAWINGS

The above-mentioned features of the present disclosure will become more apparent with reference to the following description taken in conjunction with the accompanying drawings wherein like reference numerals denote like elements and in which.

DETAILED DESCRIPTION

The existing set of tools may either attempt to walk the call stack directly or invoke functions on a separate (sampler) thread to obtain the interrupted thread's call stack. Attempting to walk the call stack at the interrupt level is not ideal, because applications may have stacks that have been paged out. As a result, a user-mode sampling thread may be employed to walk the call stacks when requested. On multi-processor systems, requesting that a separate thread gather the interrupted thread's call stack may allow the interrupted thread to migrate to a different processor and make forward progress, i.e., continue execution, while the call stack is being gathered. The gathered call stack will not reflect the state of the thread at the time it was interrupted.

According to an embodiment of the present invention, a sampling configuration is provided that determines why a processor is being utilized in a particular manner. In one embodiment, a call stack is gathered at each sample. As a result, a determination may be made as to how functions were called in contrast with a profiler that is typically utilized to provide sample distribution reports of recorded addresses of instructions being executed during samples and is unable to make such a determination. Further, a determination may be made as to what was the call stack that was utilized to invoke a particular function. Such a determination may help an analyst determine if a problem exists with how a particular function is being invoked, what calling sequence is being utilized the most frequently, and whether the calling sequence is necessary. In one embodiment, a report may be generated to show the different ways in which a function was called.

In gathering calls stacks for interrupted threads, there is a migration issue. That is, while the call stacks are gathered, the thread may have migrated to a different processor. It is possible to prevent thread migration by keeping all processors busy, other than the one on which the call stack will be gathered. This could be accomplished by having sampler threads spin on those processors, until the call stack is obtained for the thread of interest. However, this severely affects overall application performance. Instead, the thread of interest may be prevented from migrating to a different processor by setting its affinity to restrict it to only running on one processor. In this way the other processors do not have to be spun, so that the other processors are free to continue running the application. Thus, there is minimal application performance degradation. To reiterate, thread migration is prevented by setting the processor affinity of the interrupted/target thread to allow it to run only on the current processor.

After the call stack is retrieved, the interrupted/target thread's original affinity is restored. Setting a thread's affinity, sometimes also known as binding, causes the thread to run only on the specified processor(s). Because the sampler thread runs at high priority and on the same processor on which the interrupted thread is intended to run, the interrupted thread may not migrate to a different processor.

Figure 1:
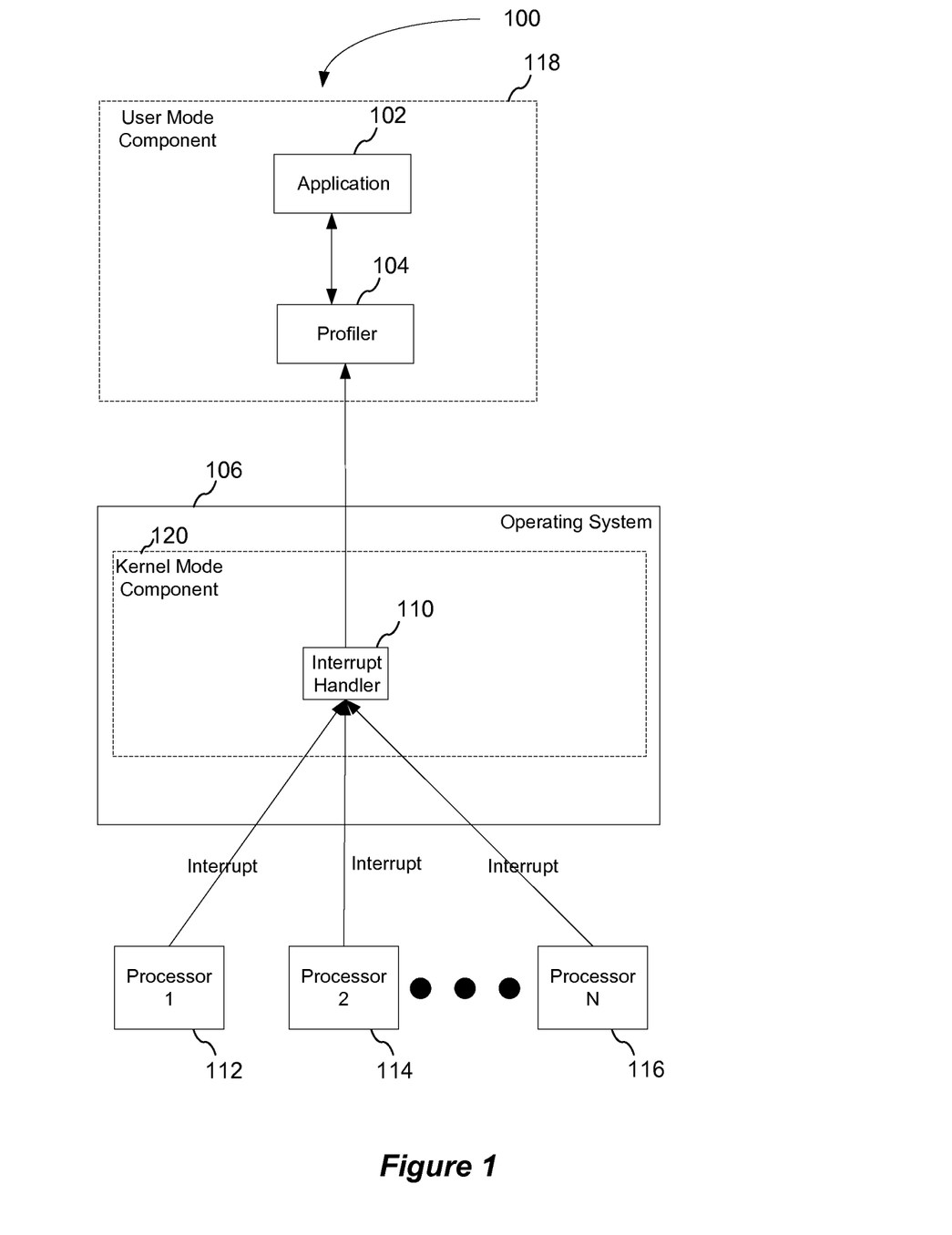
FIG. 1 illustrates a sampling system 100 according to an embodiment of the present invention.

As samples are processed, the kernel mode component 120 handling the interrupt may be able to set the interrupted thread's affinity immediately within the interrupt handler. In one embodiment, setting the affinity may occur outside the interrupt handler when interrupts are enabled. For example, a second level interrupt handler ("SLIH") or an interrupt back-end may perform this action. While handling the samples, e.g., interrupts, the interrupted thread may not make forward progress until the SLIH or the interrupt back-end has completed its processing, which would include scheduling the sampling thread(s) for the interrupted process.

In an alternative embodiment, all user-mode sampler threads, one for each processor, may spin until the interrupted threads' affinity is set. This method could be used if the operating system's support for binding or setting a thread's affinity is only supported from user mode. In another embodiment, the target thread is suspended either in the interrupt handler or in an interrupt back-end. Once the sampler thread gets control, it will set the target thread's affinity and resume (i.e., un-suspend) it. In yet another embodiment, the profiler installs a global signal handler for the application being profiled. At interrupt time, the interrupt handler signals the target thread using a predefined signal, which causes the signal handler to run in the context of the target thread. The signal handler then sets the processor affinity of the target thread, in which context it is executing, to the current processor. Subsequently, the signal handler signals the sampler thread on the current processor. The sampler runs after the signal handler signals the sampler thread.

FIG. 1 illustrates a sampling system 100 according to an embodiment of the present invention. The sampling system 100 includes a user mode component 118 that has an application 102 that interacts with a profiler 104 that profiles the application 102. The profiler 104 interacts with an operating system 106, which includes a kernel mode component 120. The kernel mode component 120 may include an interrupt handler 110. The kernel component 120 may also be a kernel extension. Further, the kernel component 120 may be a part of a device driver installed in the sampling system 100. The device driver extends the functionality of the kernel component 120. The location of the code and the calling sequence that led to the code being there is determined.

Sampler threads are listening for commands to cause them to retrieve the call stack or a thread of interest, which is performed by the profiler 104. A sampler thread is a profiler thread. Many sampler threads may be utilized as a plurality of processors may be utilized. Each sampler thread has an affinity to a single processor. Sampler threads may be very high priority threads so that they run immediately when signaled to do work such as retrieving a target thread's call stack. The target thread is the thread that has the call stack of interest to be obtained. Further, a target processor is the processor on which the target thread was running and on which affinity is set so that the target thread remains on that processor for a duration.

Once a determination is made as a result of sampling, a target thread's call stack is to be obtained. The target thread is prevented from making any forward progress during that time. In other words, the target thread is kept where it is until the call stack is gathered. Afterward, the target thread may resume.

In a multi-processor environment, an issue arises in gathering calls stacks. That is, since call stacks are gathered by profiler sampler threads, the target thread could potentially be running on another available processor, i.e., a different processor than the target processor. By the time the sampler thread gathers the call stack, the target thread may no longer be at the point where it was sampled, and the call stack would not accurately reflect where the target thread was at the time of the sample. It would be possible to address this issue by boxing out all of the processors other than the target processor, i.e. giving all the other processors busy work that is not useful to make them spin so that they do not have the sampler thread. However, this tends to significantly hinder application performance. So instead, the set of processors on which the target thread may run is restricted to the target processor, according to an embodiment of the present invention. In this way, the remaining processors may continue to do real work. Only the target processor is affected while the target thread's call stack is being retrieved. The affinity is set so that the target thread may run only on the one processor to which it has affinity. Once the target's call stack is obtained, the target thread's affinity is restored and the target thread may run on any available processor again.

The sampling system 100 may have a plurality of processors. For example, the sampling system 100 may have a first processor 112, a second processor 114, . . . , and an nth processor 116. Only one thread may run on each processor at a given time. However, that thread may potentially run on a different processor at a different time. In the sampling system 100, at least one processor generates an interrupt. In one embodiment, a sample may be driven by an interrupt. In one embodiment, the sample is based on an event. For example, the event may be time based so that the sample is generated at a constant rate for predetermined time intervals. Accordingly, each of the processors may generate an interrupt at a constant rate irrespective of the status of each of the processors, e.g., being idle or not being idle. The interrupt for each processor is generated by hardware and handled by an interrupt handler 110, which determines if the interrupted thread is one for which a call stack should be obtained. The interrupt handler 110 initiates the gathering of call stacks. Further, the interrupt handler may notify or signal a profiler sampler thread. To avoid thread migration during sampling, the affinity of a thread to a particular processor may be established.

In another embodiment, a component such as an interrupt back-end worker, offlevel processing worker, interrupt back-end worker, or the like may be utilized as only some things may be done at the interrupt level, and the rest of the work is deferred until a subsequent time.

The profiler 104 may retrieve the call stack, i.e., the execution context. Further, the profiler 104 may restore the affinity.

Figure 2:
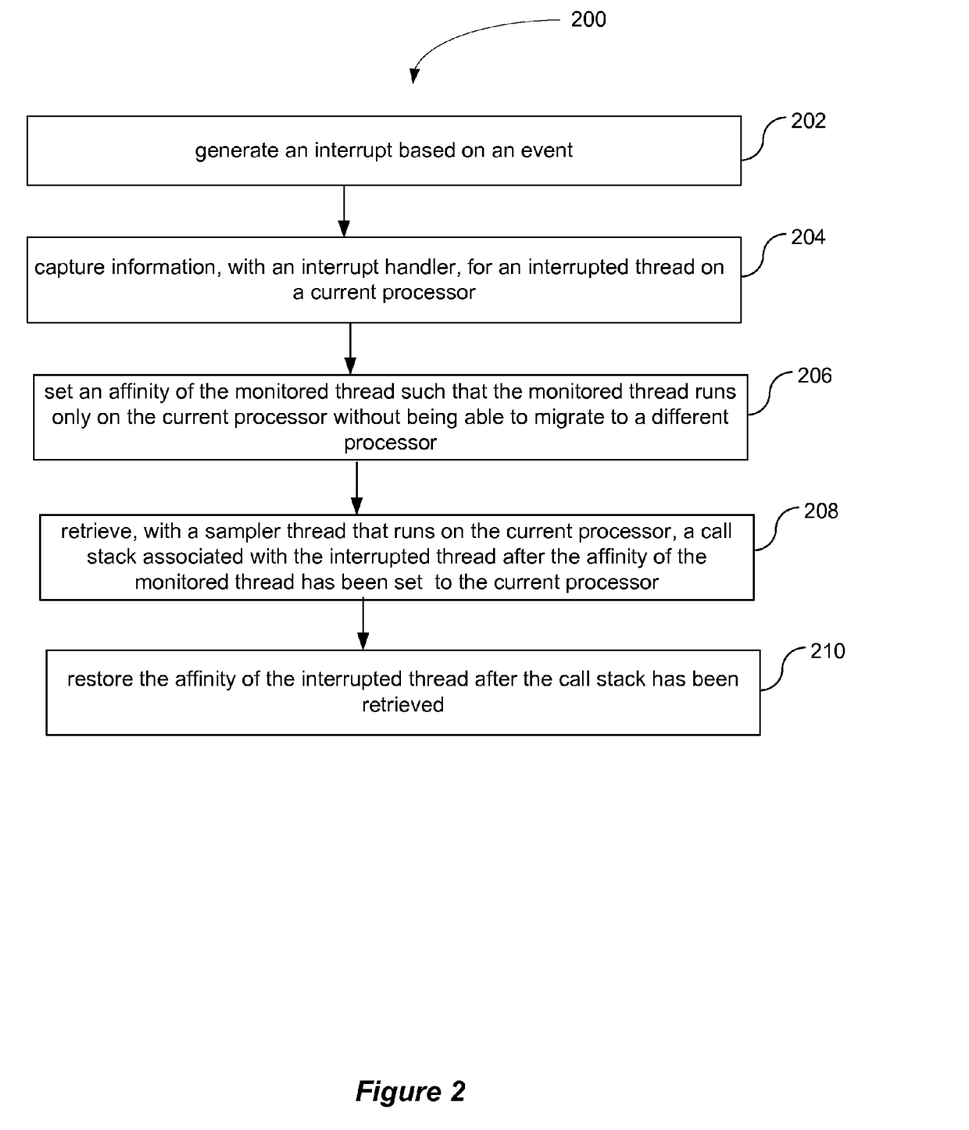
FIG. 2 illustrates a process 200 that may be utilized to sample a call stack and prevent thread migration according to an embodiment of the present invention.

FIG. 2 illustrates a process 200 that may be utilized to sample a call stack and prevent thread migration according to an embodiment of the present invention. At a process block 202, the process 200 generates an interrupt based on an event. Further, at a process block 204, the process 200 captures information, with an interrupt handler, for an interrupted thread on a current processor. The information may include the thread id ("TID"), process id ("PID"), kernel-mode and user-mode instruction pointer, and/or stack pointer. In addition, at a process block 206, the process 200 sets an affinity of the interrupted thread such that the interrupted thread runs only on the current processor without being able to migrate to a different processor. At a process block 208, the process 200 retrieves, with a sampler thread that runs on the current processor, a call stack associated with the interrupted thread after the affinity of the interrupted thread has been set to the current processor. Further, at a process block 210, the process 200 restores the affinity of the interrupted thread after the call stack has been retrieved. The call stack may be recorded in the form of a report.

In one embodiment, the call stack sampling tool contains a kernel mode component 120 and a user mode component 118 that work together. In one configuration, the underlying operating system 106 provides application program interfaces ("APIs") that allow setting a thread's affinity from kernel-mode. The user mode component 118 creates a high priority sampling thread for each processor and sets its affinity to only that processor. Each sampler thread is responsible for gathering call stacks for one or more interrupted threads that were running in that processor. Each sampler thread waits for notification from the kernel mode component. The kernel mode component 110 enables the sampling, e.g., interrupt mechanism. Interrupts will occur on each processor at a predetermined rate. The interrupt handler 110 handles the sampling interrupts. For example the interrupt handler 110 may perform the following: (1) collect the interrupted thread's information, e.g., thread id, process id, user-mode and kernel-mode instruction and stack pointers, etc.); (2) set the interrupted thread's affinity to only the processor on which it is running, e.g., the interrupted processor; (3) notify the user-mode sampler thread to collect the call stack; and (4) indicate that no more samples will be handled on this processor until the user-mode sampler thread completes. Further, the user-mode sampler thread wakes up and performs the following: (1) utilizes a virtual machine tools interface to obtain the interrupted thread's call stack or walks the interrupted thread's call stack directly; (2) restores the original interrupted thread's affinity to allow for the operating system 106 as seen in FIG. 1 to schedule the interrupted thread on any available processor; (3) save call stack and thread information; (4) notify kernel mode component 120 that processing had completed; and (5) wait for the next kernel-mode notification. In addition, the kernel mode component 120 resets the sampling mechanism and waits for the next interrupt to continue with the kernel mode component 120 handling the sampling interrupts. As a result, setting a thread's affinity is a very fast and lightweight operation and the need to spin threads on other processors for the length of time it takes to collect the interrupted thread's call stack is eliminated. Accordingly, those other processors are free to perform useful work.

In another configuration, the underlying operating system 106 as seen in FIG. 1 is assumed not to provide APIs that allow setting a thread's affinity from kernel-mode. The user mode component 118 creates a high priority sampling thread for each processor and sets its affinity to only that processor. Each sampler thread is responsible for gathering call stacks for one or more interrupted threads that were running in that processor. Each sampler thread waits for notification from the kernel mode component. Further, the kernel mode component 120 sets the sampling, e.g., interrupt, mechanism. Interrupts will occur on each processor at a predetermined rate. In addition, the kernel mode component 120 handles the sampling interrupts. The kernel mode component 120 collects the interrupted thread's information, e.g., thread id, process id, user-mode and kernel-mode instruction and stack pointers, etc. Further, the kernel mode component 120 notifies all user-mode sampler threads to wake up, but assigns the responsibility for collecting the call stack to only those samplers running on processors on which an interrupted thread has been identified to have its call stack retrieved. The kernel mode component 120 indicates that no more samples will be handled on this processor until the user-mode sampler thread completes. All user-mode sampler threads wake up and the ones which were not responsible for collecting a call stack go into a spin loop to wait for the samplers tasked with collecting a call stack to set their interrupted threads' affinity whereas the samplers with work to do, i.e., tasked with collecting call stacks set the interrupted thread's affinity to only the processor on which it was running, e.g., the interrupted processor, and join the spin until all interrupted threads have had their affinity changed. Once all interrupted threads have had their affinity changed, samplers which were not tasked with collecting a call stack stop spinning and go back to waiting for kernel-mode notification. Further, samplers tasked with collecting a call stack continue processing. In addition, samplers either request the interrupted thread's call stack utilizing virtual machine tools interface application programming interfaces ("APIs") or retrieve the interrupted thread's call stack directly. The original interrupted thread's affinity is restored, which allows the operating system 106 to schedule the interrupted thread on any available processor. Further, the call stack and thread information is saved. The kernel mode component 120 is notified that processing has completed. Samplers go back to waiting for the next kernel-mode notification. The kernel mode component 120 resets the sampling mechanism and waits for the next interrupt to continue with the kernel mode component 120 handling the sampling interrupts. As a result, setting a thread's affinity is a very fast and lightweight operation and the length of time during which sampler threads on other processors need to spin is significantly reduced. The time is reduced from the length of time it takes to collect the interrupted thread's call stack to the length of time needed to set affinity of the interrupted threads. Once affinity is set, the spinning processors are free to perform useful work.

Variations of the configurations provided herein may be utilized to allow for collecting the call stacks asynchronously. Instead of making a synchronous call to a virtual machine tools interface to collect the call stack, a sampler would request that the call stack be collected for the interrupted thread asynchronously, e.g., by setting a notification flag, at the next convenient time, and then wait for a notification from the virtual machine when the request is completed. At that time, the sampler would restore the interrupted thread's affinity. Because collecting a call stack may be a lengthy operation, once the request is made to the virtual machine to collect the call stack, the sampler would yield the processor. The interrupted thread will not migrate away from that processor. In order to get the call stack from the interrupted thread as soon as possible, after setting the notification flag, the sampler thread could increase the priority of the interrupted thread and block. When the notification occurs, the profiler 104 would retrieve and process the call stack and before restore the thread's original priority.

Figure 3:
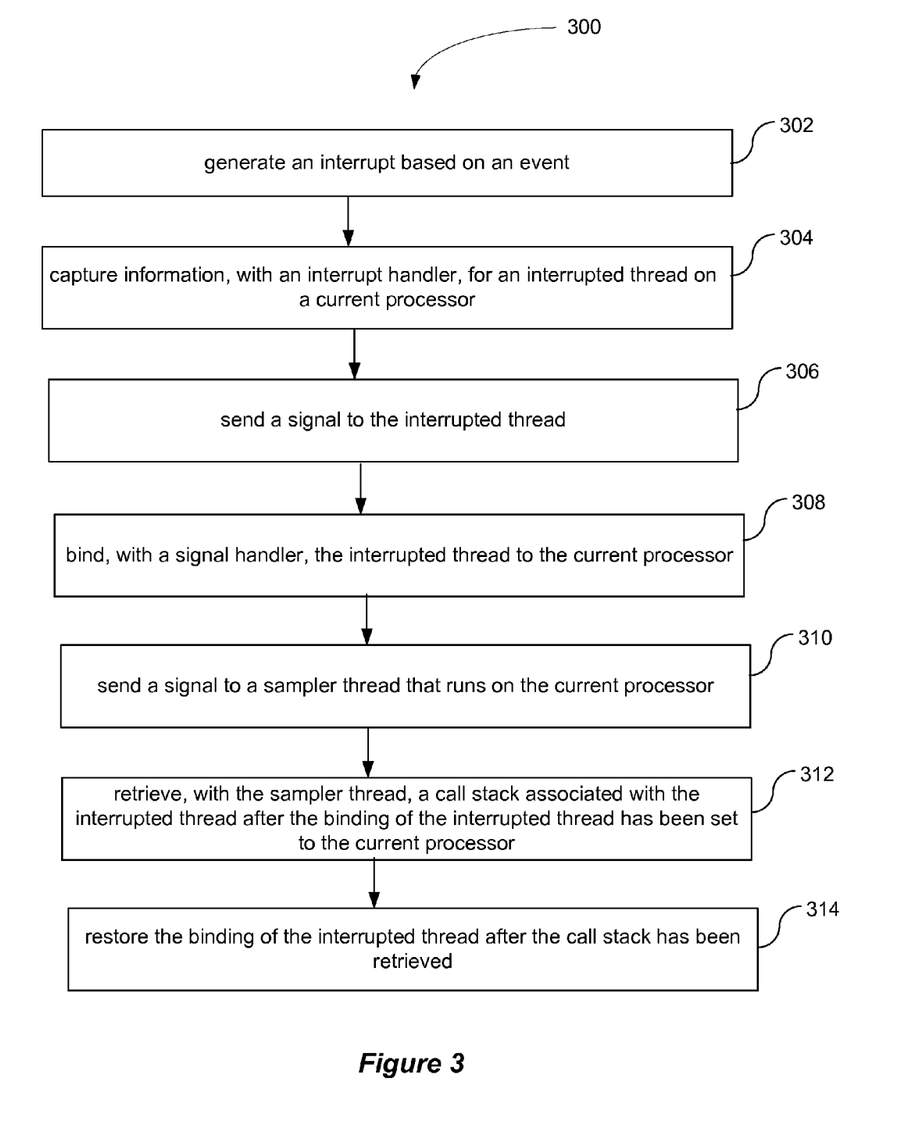
FIG. 3 illustrates a process 300 that may be utilized to utilize at least one signal to avoid forward progress when getting an interrupt driven call stack according to an embodiment of the present invention.

FIG. 3 illustrates a process 300 that may be utilized to avoid forward progress when getting an interrupt driven call stack according to an embodiment of the present invention. At a process block 302, the process 300 generates an interrupt based on an event. Further, at a process block 304, the process 300 captures information, with an interrupt handler, for an interrupted thread. In addition, at a process block 306, the process 300 sends a signal to the interrupted thread. At a process block 308, the process 300 binds, with a signal handler, the interrupted thread to the current processor. Further, at a process block 310, the process 300 sends a signal to a sampler thread that runs on the current processor. In addition, at a process block 312, the process 300 retrieves, with the sampler thread, a call stack associated with the interrupted thread after the binding of the interrupted thread has been set to the current processor. At a process block 314, the process 300 restores the binding of the interrupted thread after the call stack has been retrieved.

In one embodiment, the signal handler is installed when the processing is registered for call stack sampling and its sampler threads are allocated. After the hardware is set up to generate one or more interrupts for the requested events, the interrupt is signaled and the interrupt handler handles the interrupt. The interrupt handler then signals the interrupted thread, which may be effectuated by an SLIH or an interrupt back-end as long as they occur on the same processor as the interrupting processor. The signal handler is then executed before the interrupted thread is allowed to resume normal execution. The signal handler may then perform various actions to cause the interrupted thread to be bound to the processor and allow the sampler thread to retrieve the call stack. In one embodiment, the signal handler binds (i.e., sets the affinity of the interrupted thread to the processor on which it was interrupted and then signals the sampler thread for that processor to get the interrupted thread's call stack). Because the signal handler may run on any processor, care must be taken to make sure the interrupted thread is bound to the correct processor, not necessarily the one on which the signal handler is running. In one embodiment, the interrupt handler maintains a per-processor entry containing the interrupted thread identifier. The signal handler searches the processor entry for its thread id and binds the thread to that processor. Other variations may be utilized.

When the sampler thread has determined that the interrupted thread is bound to the interrupted process, the sampler thread then requests or gets the call stack. In one embodiment, the sampler thread may set the affinity or know that the affinity was set by the signal handler.

With respect to native call stacks, one approach is to have the monitored application link with a library that supports the registration of monitoring and the installation of a signal handler. Alternatively, support may be added dynamically for an interrupted process using a mechanism similar to the process debuggers use to attach to an already running program. Although this may not be possible on the first interrupt, a daemon process may be scheduled to initiate the attachment in an expedited manner for subsequent interrupts against that process to be handled via this disclosed method.

Figure 4:
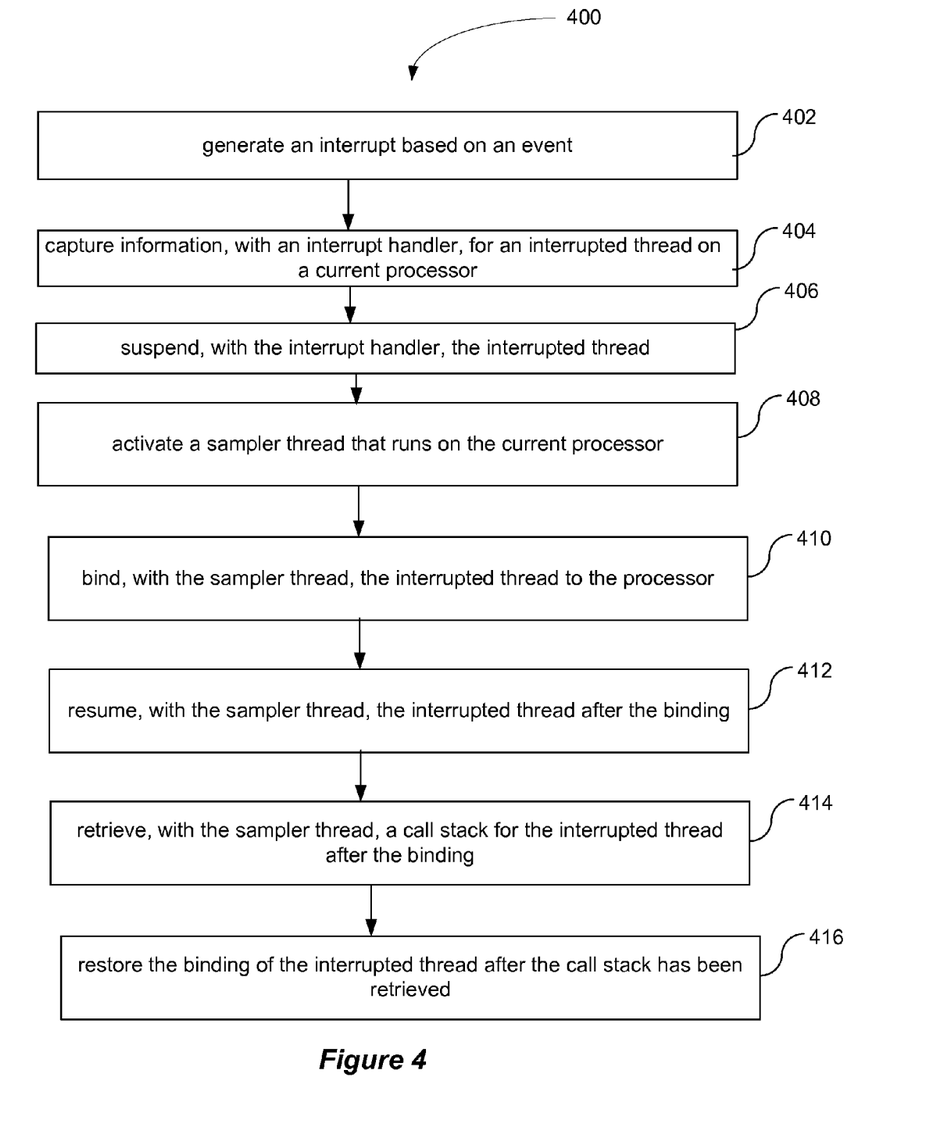
FIG. 4 illustrates a process 400 that suspends a thread until its processor affinity may be set to avoid forward progress when getting a call stack according to an embodiment of the present invention.

FIG. 4 illustrates a process 400 that suspends a thread until its processor affinity may be set to reduce forward progress when getting a call stack according to an embodiment of the present invention. At a process block 402, the process 400 generates an interrupt based on an event. Further, at a process block 404, the process 400 captures information, with an interrupt handler, for an interrupted thread on a current processor. In addition, at a process block 406, the process 400 suspends, with the interrupt handler, the interrupted thread. At a process block 408, the process 400 activates a sampler thread that runs on the current processor. In addition, at a process block 410, the process 400 binds, with the sampler thread, the interrupted thread to the processor. The sampler thread may perform the binding by utilizing available APIs and/or operating system services. At a process block 412, the process 400 resumes, with the sampler thread, the interrupted thread after the binding. Further, at a process block 414, the process 400 retrieves, with the sampler thread, a call stack fro the interrupted thread after the binding. In addition, at a process block 416, the process 400 restores the binding of the interrupted thread after the call stack has been retrieved.

When the call stack is retrieved, various actions may take place. In one embodiment, the retrieved call stack is walked into a tree and the leaf node of the tree has its base count incremented, which allows for utilization of the technology to produce reports or to view the collected information.

Figure 5:
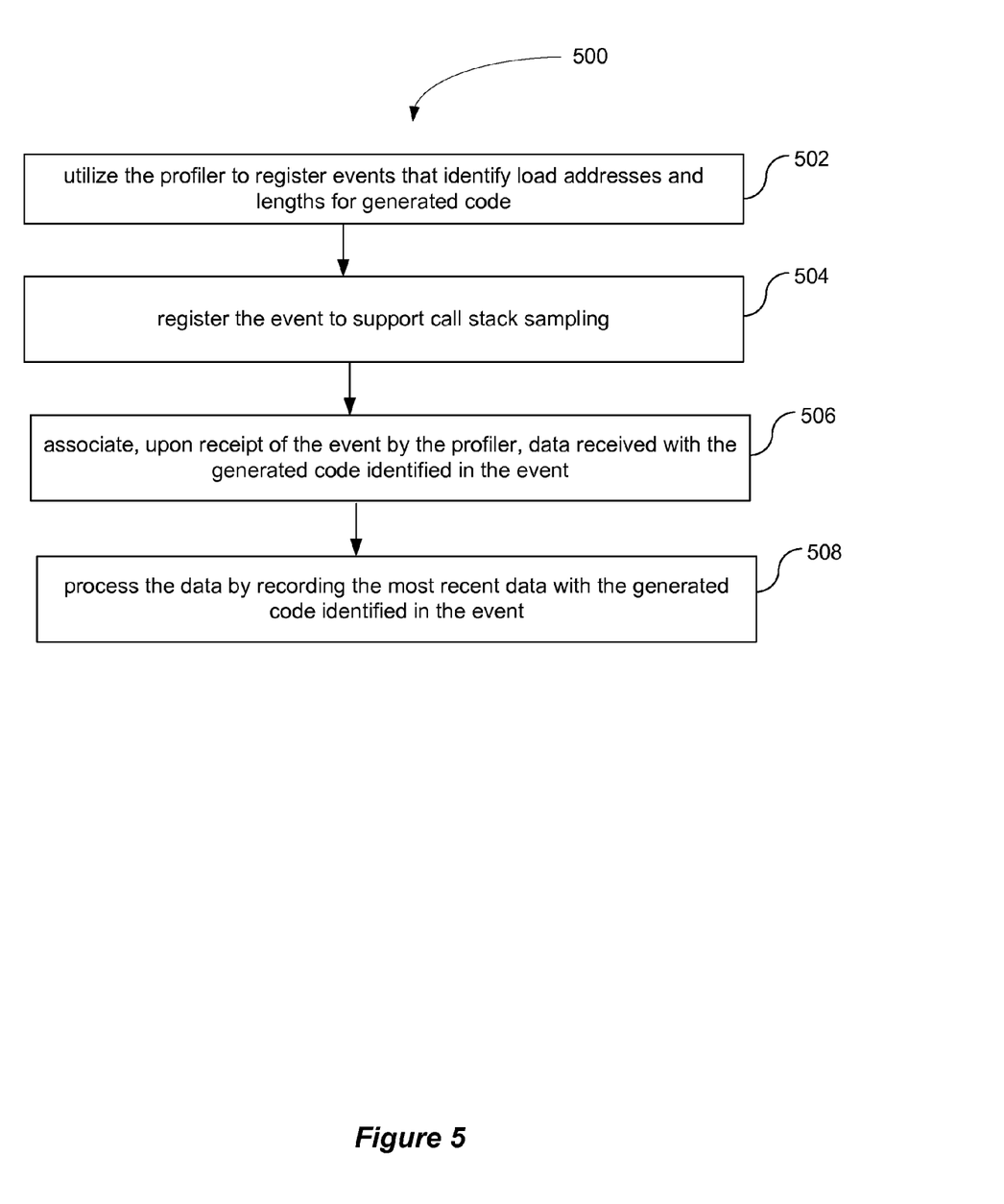
FIG. 5 illustrates a process 500 that may be utilized to profile static and dynamic code according to an embodiment of the present invention.

In yet another embodiment, profiling static and dynamic code may be utilized. FIG. 5 illustrates a process 500 that may be utilized to profile static and dynamic code according to an embodiment of the present invention. At a process block 502, the process 500 utilizes the profiler 104 to register events that identify load addresses and lengths for generated code. As an example, a virtual machine tool interface event may identify a load address and length of the generated code. Further, at a process block 504, the process 500 registers the event to support call stack sampling. In addition, at a process block 506, the process 500 associates, upon receipt of the event by the profiler 104, data received with the generated code identified in the event. At a process block 508, the profiler 104 processes the data by recording the most recent data with the generated code identified in the event. In an alternative embodiment, the profiler 104 may associate the data utilizing a Last In First Out ("LIFO") queue to give priority to the most recently generated code.

In another embodiment, the data recorded by the profiler 104 is handed to a component handling Address to Name ("A2N") resolution. The component may have specialized support for code that is generated dynamically and may be overlaid.

After retrieving a call stack, the sampler thread determines if the instruction pointer received from the interrupt handler falls within the address for the function being executed at the leaf node of a tree. If the instruction pointer falls within the leaf node, the sampler thread indicates that the target thread did not drift (I.e., execute instructions) since the time the target thread was interrupted. If the instruction pointer does not fall within the leaf function, the target thread drifted since the time the target thread was interrupted. The target thread was interrupted at the address given by the instruction pointer. However, that address is not within the function being executed as indicated by the retrieved call stack. In other words, the target thread is not where it was interrupted and has drifted. The sampler inspects other functions near the leaf node. In other words, the functions that appear in the tree as immediate callers of the leaf functions (i.e., functions that directly call the leaf function or functions directly called by the leaf function.) The functions that directly call the leaf function are callers, and the functions that are directly called by the leaf function are callees. If the instruction pointer is resolved to either a caller or a callee then the exact location of the drifted target thread may be determined. Accordingly, corrections may be made in the tree by incrementing the occurrence counts in the actual caller or callee node, which is where the target thread was actually interrupted. If the instruction pointer is not resolved to either a caller or a callee, then the occurrence count on the leaf node is incremented because that is the location of the target thread regardless of where the target thread was interrupted.

Subsequently, a report regarding the address range match is generated. While generating the report, the address ranges are converted to symbols. The conversion is performed by identifying functions in the address range and utilizing the A2N component to retrieve start addresses and lengths. When the report is generated, the A2N information is utilized to identify function names. In addition, names that are added to the reports are also determined along with identifying which leaves bases should be incremented to reflect an accurate picture of the call stack samples.

Accordingly, static and dynamic code is profiled utilizing the data collected by a device driver and data gathered for generated code. The profiling determines if an instruction address range collected by the device driver falls within the range of the generated code as specified by a virtual machine. This data may be utilized to determine the name of a routine that was executing at the time of an interrupt.

Further, in one embodiment, the address change is resolved in real time. Therefore, dynamic code may also be accounted for during post processing. Similarly, static code may be profiled utilizing a real time analysis The processes described herein may be implemented in one or more general, multi-purpose or single purpose processor. Such a processor or processors will execute instructions, either at the assembly, compiled or machine-level, to perform the processes. Those instructions may be written by one of ordinary skill in the art following the description of the figures corresponding to the processes and stored or transmitted on a computer readable medium. The instructions may also be created using source code or any other known computer-aided design tool.

Figure 6:
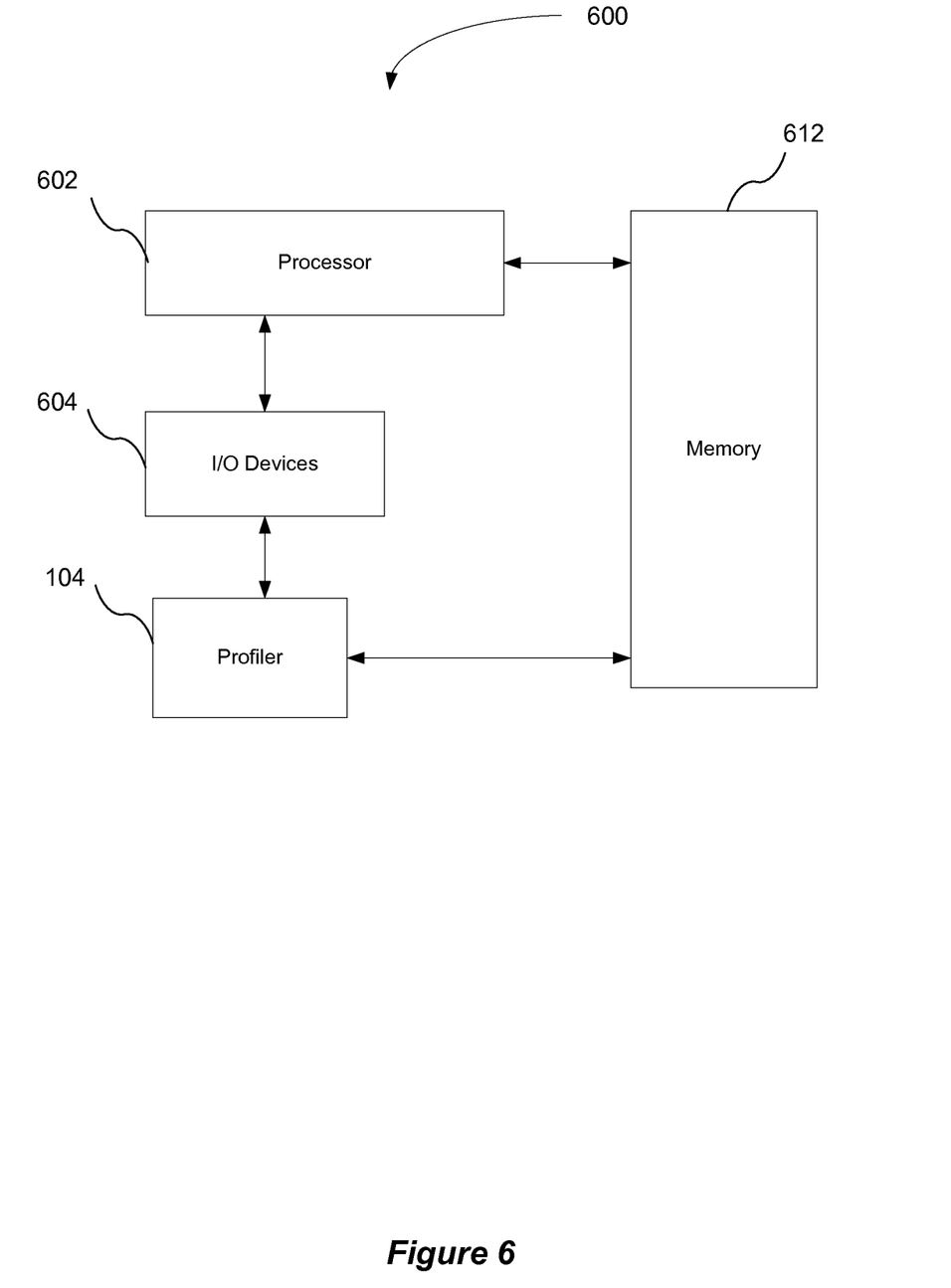
FIG. 6 illustrates a block diagram of a system 600 that prevents thread migration according to an embodiment of the present invention.

FIG. 6 illustrates a block diagram of a system 600 that prevents thread migration according to an embodiment of the present invention. In one embodiment, the system 600 is suitable for storing and/or executing program code and is implemented using a general purpose computer or any other hardware equivalents. Thus, the system 600 comprises a processor 602, a memory 612, e.g., random access memory ("RAM") and/or read only memory ("ROM"), the profiler 104, and various input/output devices 604.

The processor 602 is coupled, either directly or indirectly, to the memory 612 through a system bus. The memory 612 may include local memory employed during actual execution of the program code, bulk storage, and/or cache memories which provide temporary storage of at least some program code in order to reduce the number of times code must be retrieved from bulk storage during execution.

The input/output devices 604 may be coupled directly to the system 600 or through intervening input/output controllers. Further, the input/output devices 604 may include a keyboard, a keypad, a mouse, a microphone for capturing speech commands, a pointing device, and other user input devices that will be recognized by one of ordinary skill in the art. Further, the input/output devices 904 may include a receiver, transmitter, speaker, display, image capture sensor, biometric sensor, etc. In addition, the input/output devices 604 may include storage devices such as a tape drive, floppy drive, hard disk drive, compact disk ("CD") drive, digital video disk ("DVD") drive, etc.

Network adapters may also be coupled to the system 900 to enable the system 900 to become coupled to other systems, remote printers, or storage devices through intervening private or public networks. Modems, cable modems, and Ethernet cards are just a few of the currently available types of network adapters.

For any of the configurations described herein, various actions may take place when the call stack is retrieved. In one embodiment, the retrieved call stack is walked into a tree and the leaf node of the tree has its base count incremented, which allows for utilization of technology to produce reports or to view the collected information.

Any of the configurations described herein may be utilized with a virtual machine. A virtual machine may be configured to keep track of calling state and return that state referring to a virtual machine supported interface to return call stacks. For instance, information about execution of threads may be obtained through trace data. This information may include call stack information obtained from call stacks associated with threads of interest. A virtual machine may be utilized to obtain the call stack information. Various approaches may be utilized by the virtual machine to obtain the call stack information. For example, entry/exit events, an application timer tick, or instrumenting codes that sample the instrumented values may be utilized. A selected sampling thread may send a call to the virtual machine to obtain the call stack information. The selected sampling thread may make the call to the virtual machine through a virtual machine interface. The virtual machine interfaces may return call stack information to the sampling thread or may store the call stack information in some work area. The obtained information may be placed into a tree for later analysis.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that may communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The "processor" of a general purpose computer, special purpose computer, or other programmable data processing apparatus may be referred to herein as a "microprocessor." However, the term "microprocessor" should not be interpreted as being limited to a single-chip central processing unit or any other particular type of programmable data processing apparatus, unless explicitly so stated.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

Reference throughout this Specification to "one embodiment," "an embodiment," or similar language means that a particular feature, structure, or characteristic described in connection with the embodiment is included in at least one embodiment of the present invention. Thus, appearances of the phrase "in one embodiment," "in an embodiment," and similar language throughout this Specification may, but do not necessarily, all refer to the same embodiment. Furthermore, the described features, structures, or characteristics of the invention may be combined in any suitable manner in one or more embodiments. Correspondingly, even if features are initially claimed as acting in certain combinations, one or more features from a claimed combination may in some cases be excised from the combination, and the claimed combination may be directed to a subcombination or variation of a subcombination.

While the apparatus and method have been described in terms of what are presently considered to be the most practical and preferred embodiments, it is to be understood that the disclosure need not be limited to the disclosed embodiments. The disclosure is intended to cover various modifications and similar arrangements included within the spirit and scope of the claims, the scope of which should be accorded the broadest interpretation so as to encompass all such modifications and similar structures. The present disclosure includes any and all embodiments of the following claims.

We claim:

1. A computer program product comprising a computer useable medium having a computer readable program, wherein the computer readable program when executed on a computer causes the computer to:
  generate an interrupt based on an event;
  capture information, with an interrupt handler, for an interrupted thread on a current processor from among a plurality of processors;
  set an affinity of the interrupted thread such that the interrupted thread runs only on the current processor without being able to migrate to a different processor from among the plurality of processors;
  retrieve, with a profiler thread that runs on the current processor, a call stack associated with the interrupted thread after the affinity of the interrupted thread has been set to the current processor; and
  restore the affinity of the interrupted thread after the call stack has been retrieved.

2. The computer program product of claim 1, wherein a signal handler is utilized to set the affinity of the interrupted thread.

3. The computer program product of claim 1, wherein the computer is further caused to suspend the interrupted thread after the interrupted thread is identified.

4. The computer program product of claim 1, wherein the computer is further caused to resume the interrupted thread after the affinity is set.

5. The computer program product of claim 1, wherein the computer is further caused to detect thread drift and correct the thread drift upon the detection by comparing a current instruction pointer to an instruction pointer captured at a time of the interrupt.

6. The computer program product of claim 1, wherein the computer is further caused to register, with a profiler, the event to identify a load address and a length for generated code.

7. The computer program product of claim 2, wherein the profiler thread retrieves the call stack based upon receiving a signal from the signal handler.

8. The computer program product of claim 2, wherein the interrupted thread is bound to the current processor, irrespective of an operating system attempting to schedule the signal handler to execute on the different processor, by searching a processor table for the current processor to bind the interrupted thread.

9. A method comprising:
  generating a sample based on an event;
  capture information, with an interrupt handler, for an interrupted thread on a current processor from among a plurality of processors;
  setting an affinity of the interrupted thread such that the interrupted thread runs only on the current processor without being able to migrate to a different processor from among the plurality of processors;
  retrieving, with a profiler thread that runs on the current processor, a call stack associated with the interrupted thread after the affinity of the interrupted thread has been set to the current processor; and
  restoring the affinity of the interrupted thread after the call stack has been retrieved.

10. The method of claim 9, wherein a signal handler is utilized to set the affinity of the interrupted thread.

11. The method of claim 9, further comprising suspending the interrupted thread after the interrupted thread is identified.

12. The method of claim 9, further comprising resuming the interrupted thread after the affinity is set.

13. The method of claim 9, further comprising detecting thread drift and correcting the thread drift upon the detection by comparing a current instruction pointer to an instruction pointer captured at a time of the interrupt.

14. The method of claim 9, further comprising registering, with a profiler, the event to identify a load address and a length for generated code.

15. The method of claim 10, wherein the profiler thread retrieves the call stack based upon receiving a signal from the signal handler.

16. The method of claim 10, wherein the interrupted thread is bound to the current processor, irrespective of an operating system attempting to schedule the signal handler to execute on the different processor, by searching a processor table for the current processor to bind the interrupted thread.

17. A system comprising:
  a current processor from among a plurality of processors that generates an interrupt based on an event;
  an operating system that (i) captures information, with an interrupt handler, for an interrupted thread on the current processor and (ii) sets an affinity of the interrupted thread such that the interrupted thread runs only on the current processor without being able to migrate to a different processor from among the plurality of processors;
  a profiler that (i) retrieves, with a profiler thread that runs on the current processor, a call stack associated with the interrupted thread after the affinity of the interrupted thread has been set to the current processor.

18. The system of claim 17, further comprising a signal handler that is utilized to set the affinity of the interrupted thread.

19. The system of claim 17, wherein the interrupted thread is suspended after the interrupted thread is identified.

20. The system of claim 17, wherein the interrupted thread is resumed the after the affinity is set.

21. The system of claim 17, wherein thread drift is detected and the thread drift is corrected upon the detection by comparing a current instruction pointer to an instruction pointer captured at a time of the interrupt.

22. The system of claim 17, wherein the profiler further registers the event to identify a load address and a length for generated code.

23. The system of claim 18, wherein the profiler thread retrieves the call stack based upon receiving a signal from the signal handler.

24. The system of claim 18, wherein the interrupted thread is bound to the current processor, irrespective of an operating system attempting to schedule the signal handler to execute on the different processor, by searching a processor table for the current processor to bind the interrupted thread.

25. A computer program product comprising a computer useable medium having a computer readable program, wherein the computer readable program when executed on a computer causes the computer to:
  generate, with a current processor from among a plurality of processors, an interrupt based on an event;
  capture information, with an interrupt handler, for an interrupted thread on the current processor;
  set an affinity of the interrupted thread such that the interrupted thread runs only on the current processor without being able to migrate to a different processor from among the plurality of processors;

retrieve, with a profiler thread that runs on the current processor, a call stack associated with the interrupted thread after the affinity of the interrupted thread has been set to the current processor; and restore the affinity of the interrupted thread after the call stack has been retrieved;

compare a current instruction pointer to an instruction pointer captured at a time of the interrupt to detect thread drift; and correct the thread drift upon the detection.

* * * * *